United States Patent [19]

van den Berg

[11] 4,319,010
[45] Mar. 9, 1982

[54] PROCESS FOR THE POLYMERIZATION OF ALKENES

[75] Inventor: Cornelis E. P. V. van den Berg, Geleen, Netherlands

[73] Assignee: Stamicarbon, B.V., Geleen, Netherlands

[21] Appl. No.: 735,440

[22] Filed: Oct. 26, 1976

Related U.S. Application Data

[63] Continuation of Ser. No. 501,616, Aug. 29, 1974, abandoned, which is a continuation of Ser. No. 203,429, Nov. 30, 1971, abandoned.

[30] Foreign Application Priority Data

Dec. 2, 1970 [NL] Netherlands .......................... 7017569

[51] Int. Cl.$^3$ ........................... C08F 4/02; C08F 4/64; C08F 10/02
[52] U.S. Cl. ................................ 526/124; 252/429 B; 252/429 C; 252/431 R; 526/125; 526/155; 526/352
[58] Field of Search ................................ 526/124, 125

[56] References Cited

U.S. PATENT DOCUMENTS 3,644,318  2/1972  Diedrich et al. .................... 526/124

FOREIGN PATENT DOCUMENTS

| 434785 | 4/1973 | Australia . |
| 435820 | 5/1973 | Australia . |
| 733064 | 11/1969 | Belgium . |
| 7000094 | 7/1970 | Netherlands . |
| 824374 | 11/1959 | United Kingdom . |
| 1001820 | 8/1965 | United Kingdom . |
| 1235062 | 6/1971 | United Kingdom ................ 526/151 |

*Primary Examiner*—Edward J. Smith
*Attorney, Agent, or Firm*—Cushman, Darby & Cushman

[57] ABSTRACT

A process for solution polymerizing α-alkenes is disclosed, wherein the α-alkenes are polymerized at a temperature above 110° C. in the presence of a catalyst which is dissolved in the reaction solvent. The catalyst is obtained by admixing a titanium compound, a magnesium compound which is not magnesiummono- or dihydrocarbyl, and an aluminum compound having the general formula $AlR_{3-m}X_m$, wherein R is the hydrocarbyl group, X is a halogen atom, and m is between 1 and 3.

6 Claims, No Drawings

PROCESS FOR THE POLYMERIZATION OF ALKENES

This is a continuation of application Ser. No. 501,616, filed Aug. 29, 1974, which in turn is a continuation of application Ser. No. 203,429, filed Nov. 30, 1971, both now abandoned.

BACKGROUND OF THE INVENTION

U.S. Pat. No. 3,392,159 discloses that alkenes can be suspension polymerized at temperatures of 100° C. or less in the presence of a catalyst which is prepared by adding an organo-magnesium compound to a titanium compound and, optionally, subsequently adding an organo-aluminum compound to the mixture of the magnesium and the titanium compounds. The organo-magnesium compound which is used in the process of this patent is obtained as a reaction mixture, having a solid phase and a liquid phase. The patent discloses that both of these two phases are preferably added to the titanium compound, in view of the polymerization efficiency and the resulting polymer properties. The reaction between the organo-magnesium compound and the titanium compound normally produces a reaction mixture which consists of a blackish precipitate which is finely distributed in a liquid phase.

French Pat. No. 2,016,081 discloses that alkenes can be polymerized at reaction temperatures of 20°–150° C., preferably 50°–100° C., in the presence of a special type of supported catalyst. The active catalyst component consists of a hydrocarbon-insoluble reaction product of a titanium compound and a magnesium alcoholate, to which reaction product an organo-aluminum compound has been added. Unconverted titanium compound is washed out of the catalyst with hydrocarbons. Prior to the reaction with the titanium compound, the magnesium alcoholate may be reacted with other inert solid substances, like various halogenides, sulphates, carbonates and the like, e.g., $MgCl_2$, $BaCO_3$, etc.

U.S. Pat. No. 3,453,346 discloses that block copolymers can be prepared from α-olefins, and vinyl halides or vinylidene halides in the presence of solid polymerization catalysts which consist of a mixture of a halide of a transition metal of Groups IV–VI of the Periodic System such as $TiCl_4$, $TiCl_3$ or $TiCl_2$, and an organo metallic compound of an element of Group I-A or II, or an aluminum compound. Lithium compounds are preferred. The patent discloses that a third catalyst component may optionally be added to increase stereospecificity. The third catalyst component may be an alkali halide, magnesium oxide, aromatic ethers, hydrides of sodium, potassium, lithium, calcium, magnesium, barium, strontium, aluminum, titanium, or zinc.

Co-pending U.S. patent application Ser. No. 824,996, filed May 15, 1969, discloses the process for polymerizing alkenes in the presence of a catalyst comprising a mixture of an organo-aluminum halide, a titanium compound and an organo-magnesium compound, to which mixture an activator is added. The activator is an oxyhydrocarbon such as an alcohol, acid, ester, aldehyde or ketone.

All of the catalyst systems disclosed in the above identified patents and patent applications are either prepared from mono- or dihydrocarbylmagnesium, or contain solid components dispersed in a liquid vehicle. Mono- or dihydrocarbylmagnesium compounds are inflammable, and are also susceptible to the action of moisture and oxygen. Special precautions are therefore required for the use of such compounds.

Special precautions are also required when catalysts are used which contain solid components, such as supported catalysts, otherwise such catalysts may give rise to substantial process difficulties. For instance, a suspension of such a solid catalyst will settle if it is not sufficiently agitated, and there is a substantial danger of catalyst accumulation in the reactor. It is rather difficult to maintain a homogeneous distribution of suspended catalysts in a suspension vehicle, and non-uniform polymer product may be obtained.

French Pat. No. 1,169,039 discloses that alkenes, and many other polymerizable compounds, can be polymerized in the presence of a catalyst system which may be a titanium halide and an organo-metal compound, to which aluminum alcoholate, for instance, is added. The patent discloses that alcoholates of 14 other metals, including magnesium, may be added, but that sodium propoxide, calcium phenoxide, and aluminum ethoxide are preferred. The patent is directed toward obtaining polymers having higher molecular weights. As illustrated in the working example of this patent, the catalyst activity is lowered by the addition of the metal alcoholate.

SUMMARY OF THE INVENTION

At least 1 alkene is solution polymerized in a liquid organic solvent at temperatures of at least 110° C., forming a solution of the alkene polymer in the presence of a catalyst dissolved in a liquid organic solvent, the catalyst being obtained by mixing a titanium compound, an aluminum compound, and a magnesium compound which is not magnesiummono- or dihydrocarbyl, the ratio of magnesium: aluminum being 0.01 to 1.5, the ratio of aluminum:transition metal being 8–2000 and the transition metal compound concentration in the reaction medium being 0.005–0.2 mmol per liter.

DESCRIPTION OF THE INVENTION

The present invention provides an improved process for the solution polymerization of alkenes. At least one alkene is solution polymerized in a liquid organic solvent at a temperature above 110° C. in the presence of a catalyst dissolved in the organic solvent. The catalyst is obtained by admixing a titanium compound, such as titanium tetrachloride; at least 1 aluminum compound of the average general formula $AlR_{3-z}X_z$, wherein R is an alkyl, alkenyl, cycloalkyl, alkaryl, aryl or aralkyl radical, containing 1–30 carbon atoms, X is a halogen atom and z has a value between 1 and 3; and a magnesium compound, which is a magnesium salt of an organic or anorganic acid, a magnesium hydrocarboxide, wherein each hydrocarboxide radical contains up to 30 carbon atoms, or complexes of the above magnesium compounds. For the most active catalyst system, which is decidedly preferred herein, the molar ratio of Mg/Al is less than 1. The ratio of Al:Ti is 8–2000. The titanium concentration in the polymerization medium is between 0.0005 and 0.2 mmol per liter.

The present process provides very high catalyst activity in the solution polymerization of alkenes. The catalyst is dissolved in the liquid organic solvent, and no solid catalyst particles can accumulate in the reactor. The pumping and attempted uniform distribution of a suspension of catalyst components can be avoided. The reactor contents, when using the process of the present invention, consists of a solution in which no solids can be observed by the naked eye.

As will be appreciated from the aforesaid molar ratios, only quite small amounts of magnesium compounds are required in the catalyst system of the present invention. That this small amount of magnesium compounds go into solution is quite apparent from the normal sharp increase in viscosity of the reaction mixture. The process is preferably conducted such that the magnesium compound is added to the liquid solvent, to the other catalyst components or to the polymerization mixture, in the form of a clear, or substantially clear, solution.

The molar ratio between the magnesium compound and the organo-aluminum halide is between 0.01 and 1.5. Ratios falling within this range produce an active catalyst system. In the most preferred embodiment of the process of the present invention, which is decidedly preferred as the catalyst system has such a high activity that catalyst residues need not be removed from the polymer, as such small amounts of catalyst are used that the catalyst residues are quite low, the molar ratio between the magnesium compound and the aluminum compound having the average general formula $AlR_{3-z}X_z$ is less than 1.

In order to obtain an active catalyst system, the ratio between the aluminum compound and the titanium compound should be in the range of 8-2000. Preferably, this ratio is between 10 and 1500 and more preferably between 10 and 600. A catalyst having a ratio of aluminum to titanium compounds which lies outside the above range has a lower activity, yields less reproducible results, or is more susceptible to impurities in the polymerization medium, with the result that the polymerization process is more difficult to control.

Surprisingly, under the above critical process parameters, one of the 15 compounds mentioned in French Pat. No. 1,169,039, unlike the others, produces a catalyst system which results in polymer yields many hundreds of times larger than that which is obtained according to the example in the French patent.

The magnesium compound which is not magnesium-mono- or dihydrocarbyl, is a salt of an organic or inorganic acid, a hydrocarboxide of up to 30 carbon atoms or a complex of these magnesium compounds with other compounds e.g. with an aluminum compound.

Examples of suitable magnesium hydrocarboxides include magnesium isopropylate and magnesium decanolate. The magnesium salt of an inorganic acid is preferably magnesium chloride, but magnesium fluorides and magnesium bromides as well as mixed halides may be mentioned among other suitable magnesium compounds. The magnesium compound may be a mixture of magnesium alkoxides and magnesium halides or a mixed magnesium alkoxide-halide such as, for instance, chloromagnesiumbutylate. Examples of magnesium salts of organic acids include magnesium stearate, magnesium benzoate and magnesium naphthanate. Among complexes of magnesium compounds with aluminum compound which are suitable for use in the process of the present invention are $Mg[Al(OR)_4]_2$ or $Mg_3[Al(OR)_6]_2$. Such complexes may be prepared by the method disclosed in Annalen der Chemie, Vo. 476, p. 135 (Meerwein und Bersin), the disclosure of which is hereby incorporated by reference to the extent necessary to understand the preparation of such complexes. Complexes in which one or more of the alkoxy groups have been replaced by e.g. halogen atoms may also be used with generally similar results. As mentioned above, in the process of the present invention, the magnesium components of the catalyst system are preferably dissolved in the liquid organic solvent. The magnesium compounds which make up the magnesium component of the catalyst system may be soluble in the organic solvent either in their original state, or after they have been suitably treated. Magnesium compounds that are soluble in the organic solvent strongly activate the polymerization reaction, and the dissolved magnesium compounds impart to the catalyst system a higher activity than if the magnesium compounds should be used in the form of a suspension in the organic solvent. Examples of magnesium compounds which are directly soluble in liquid organic solvents such as, for instance, pentamethyl heptane, are complexes of magnesium with aluminum compounds, having the aforementioned formulas $Mg[Al(OR)_4]_2$ or $Mg_3[Al(OR)_6]_2$.

Some magnesium compounds, such as magnesium stearate are not soluble in some cold solvents, e.g., pentamethyl heptane, but can be dissolved therein simply by heating.

More elaborate solubilization techniques must be used with other magnesium compounds, such as magnesium isopropylate or magnesium decanolate. A suspension of 0.05 mole of magnesium isopropylate and 0.05 mole of magnesium decanolate in a liter of pentamethylheptane forms a viscous solution if heated and stirred at 150° C.

A suspension of 0.1 mole of magnesium decanolate in pentamethylheptane can be converted into a clear, quite viscous solution by heating to 140° C. with stirring. However, after an additional time has elapsed, coagulation occurs such as to completely precipitate the magnesium decanolate from solution (the clear supernatant layer does not contain any magnesium). The precipitate can be dissolved in the solvent by the addition of 10 mole percent, based on the amount of magnesium decanolate present, of an aluminum compound such as a trialkyl aluminum, e.g. triethyl aluminum, or a trialkoxy aluminum compound such as, e.g. aluminum triisopropylate.

A suspension of magnesium diisopropylate will not dissolve in most polymerization solvents, e.g. pentamethylheptane, by heating or by the addition of aluminum compounds, but such a suspension is converted into a clear solution if an equimolar quantity, based on the amount of magnesium diisopropylate, of decanol is added to it.

Anhydrous magnesium chloride may be dissolved in liquid organic solvents by the addition of organo-aluminum compounds such as aluminum alkyl sesquichlorides, e.g. aluminum ethyl sesquichloride, monoalkylaluminumchloride, e.g. monobutyl aluminumchloride, or aluminum trialkyl, e.g. triethyl aluminum. Generally the organo-aluminum compound will be added in a molar ratio of aluminum:magnesium of 0.005 to 2, although greater or lesser amounts of aluminum may be used. Using this technique, an appreciable amount of magnesium chloride can thereby be dissolved in pentamethylheptane, at a temperature of 140° C.

Some magnesium compounds can be rendered soluble in the liquid organic solvent merely by suitable choice of an appropriate solvent. This approach is well within the skill of those in the art. Similarly, acid salts of magnesium, such as those described above, may also be solubilized.

When the expression "solubilized magnesium compound" is used herein, reference is to the above magnesium compounds which are either soluble per se or have been rendered soluble in the particular organic reaction solvent by the use of the above techniques.

The aluminum compound, which has the average general formula $AlR_{3-z}X_z$ may be an organo-aluminum halide, but mixtures of different aluminum compounds may also be used. It is preferred that the aluminum compound contain 1-2 halogen atoms plus at least 1 hydrocarbon radical, bonded through a carbon atom to aluminum, per aluminum atom. The chloride is the preferred halogen, although bromides and fluorides may also be used. The hydrocarbon radical, which may contain up to 30 carbon atoms, is alkyl, such as methyl, ethyl, isobutyl, hexyl, docecyl and the like, alkenyl, such as vinyl, allyl and the like, cycloalkyl such as cyclopentyl, cyclohexyl, and the like, alkaryl, such as benzyl, xylyl, cymyl, and the like, aryl, such as phenyl, naphtyl, and the like, or aralkyl, such as phenethyl, α,α-dimethyl phenethyl and naphthamethyl. The examples of suitable aluminum compounds include diethylaluminum chloride, monoethylaluminum chloride, diisobutyl aluminum chloride, diisobutylaluminum bromide, aluminum methylsesquichloride and monohexylaluminum dichloride.

Preferably, the aluminum component of the catalyst system of the process of the present invention is diethyl aluminum chloride, monoethyl aluminumchloride or aluminum ethyl sesquichloride. In some instances, it may be desired to add a trihydrocarbyl aluminum, e.g. triethyl aluminum, to the aluminum compound.

The titanium compound may be a halide, an alkoxide or a mixture thereof. Among halides, chlorides and bromides are preferred, but iodides, fluorides, oxichlorides and the like may also be used. In any event, the titanium compound must be soluble in the liquid organic solvent in quantities required for polymerization. When the titanium contains one or more alkoxide radicals therein, the alkoxide radical is preferably a lower alkoxide radical, having 1 to 6 carbon atoms. Preferably, the transition metal compound is tri- or tetravalent titaniumchloride or titanium tetra alkoxide. Most preferred titanium compounds are titanium tetrachloride and tetrabutyl titanate. In addition to the titanium compound, compounds of other transition metals, such as, e.g., vanadium, molybdenum, zirconium or chromium, such as $VCl_4$, $VOCl_3$, $MoCl_5$, $ZrCl_4$ and chromium acetylacetonate may also be used.

Concentration of the transition metal component of the polymerization medium is generally in the range of 0.0005 to 0.2 mmol per liter, preferably between 0.001 and 0.1 mmol per liter.

In certain cases, it may be desirable to add small quantities of the activators disclosed in the aforementioned copending application Ser. No. 824,996, such as alcohols, esters, acids, aldehydes or ketones, to the catalyst system, in order to increase even further the catalyst system efficiency. However, these additives must not be added in such an amount that all of the alkyl groups of the organo-aluminum compound will be replaced thereby. Alcohols are preferably used as activators, and decanol is particularly preferred. It is possible, in some instances, to dissolve the magnesium compound in an activator substance before adding same to the polymerization system.

The process of the present invention is directed to preparing crystalline homopolymers and copolymers of α-alkenes, especially α-alkenes containing 2-10 carbon atoms. Typical homopolymers are, e.g. polyethylene, polypropylene, polybutene, and poly-4-methylpentane-1. Copolymers and block copolymers generally contain 80% or more of a α-alkene and minor amounts, up to about 20 mole percent, of one or more other alkenes. The present process is particularly concerned with the preparation of polyethylene or copolymers of ethylene with at most 20 mole percent of at least one other olefinic monomer. In addition to the above crystalline homopolymers and copolymers, the process of the present invention may also be employed for preparing amorphous rubbery copolymers of ethylene and propylene, and, if a sulphur-vulcanizable copolymer is desirable, an alkadiene, such as e.g. butadiene. The polymerization process may be carried out over a wide range of pressures, from very high pressures of up to 5,000 atmospheres or over, to relatively low pressures, as low as 1 atmosphere. Preferably, relatively low pressures in the order of 1 to 200 atmospheres are used. The process may be discontinuous, semicontinuous or fully continuous, and may be single stage or multistage. Preferably, the polymerization is conducted in a reactor that is completely filled with liquid.

The liquid organic solvent may be any of the customary solvents used in alkene polymerizations conducted with coordination catalysts. Examples of suitable solvents include, for example, hexane, heptane, pentamethylheptane, gasoline, kerosene, benzene and cyclohexane. Mixtures of solvents may also be employed. If the polymerization process temperature and pressure are such that the alkene(s) to be polymerized is in the liquid state, the alkene(s) itself may be used as the solvent with no other solvent then required.

The polymerization temperature is at least 110° C. and may lie above or below the melting point of the polymer. Preferably, the polymerization is conducted at a temperature of 120°-260° C., more preferably between 130° and 200° C. At this preferred temperature, a solution of the polymer in the solvent is obtained wherein the catalyst is easily and homogeneously distributed.

The catalyst components used in the process of the present invention may be mixed with each other in various ways. For instance, the catalyst components can be mixed together at a temperature above 100° C. in the liquid organic solvent wherein an alkene is dissolved by adding the titanium compound to a mixture of the aluminum compound and the magnesium compound. It is preferred that the magnesium and titanium components can not have reacted to any substantial extent when the aluminum component is added. It is strongly preferred, however, that the three catalyst components, if dissolved in a liquid vehicle, such as, for instance, the liquid organic solvent, are separately supplied to a mixing or polymerization zone, as this step has a favorable effect upon the catalyst activity. After the catalyst components have been mixed with each other, it is preferred to allow the catalyst to age for a short while, suitably for a period of a few seconds, e.g. 4 to 5 seconds, to less than 10 minutes, although longer aging times, of, say, a few hours to a few days, may also be employed. If the catalyst components are mixed in a mixing zone, the concentrations of the catalyst components may be an arbitrarily large multiple of the concentration in the polymerization zone, such as, for example, 100-250 times as high as the concentration in the polymerization zone.

The catalyst system which is used in the process of the present invention has such a high activity that the polymerization may be carried out in a manner such that the residence time of the polymer solution in the polymerization zone will be less than 15 minutes, preferably less than 10 minutes, especially if magnesium alcoholates and/or magnesium chlorides are used as the magnesium catalyst component. Longer residence times, such as a few hours, may also be employed if desired.

The process of the present invention involves catalyst systems having activities so high that the polymer can be obtained in such a high yield, based on the amount of catalyst employed, that the catalyst residues do not have to be removed from the polymer, being present in the polymer in amounts below the maximum amounts permitted. This is a significant advantage, especially for production on a commercial scale, as the removal of catalyst residues from the polymer is a costly and laborious operation. The catalyst will be deactivated, such as by contacting same with an alcohol, but even after deactivation of the catalyst, the polymeric product obtained is normally colorless in spite of the fact that the catalyst residues have not been removed therefrom. The polymers produced by the process of the present invention have a high molecular weight, generally higher than 10,000. An indication of this high molecular weight is the intrinsic viscosity (as determined on a solution of 1 g of polymer in a liter of decalin at 135° C.), which normally lies between 0.5 and 10. Homopolymers of ethylene produced by the process of the present invention have high densities, generally higher than 0.95, and normally have melt indexes between practically 0 and about 50. The polymer may be processed by the usual process techniques, e.g. injection molding, vacuum molding, extrusion molding, etc. to produce films, tubes or other shaped articles.

EXAMPLES OF THE INVENTION
EXAMPLES 1–26

Experiments were performed. Twenty-six experiments, using various types of catalyst components in various ratios, were carried out in the way described below.

Into a double-walled glass reactor fitted with a stirrer, a thermometer, a gas inlet tube and a gas discharge tube ½ l of pentamethylheptane was introduced and subsequently heated to the desired reaction temperature and, after that, saturated with ethylene. Next, the aluminum, magnesium and titanium components, all of which were dissolved in pentamethylheptane, at concentrations of resp. 1, 0.1 and 0.1 mol/h, were successively fed into the reactor. Ethylene was passed through the reaction mixture with intensive stirring and the polymerization was allowed to continue for 10 minutes at a pressure of 1 atmosphere.

The experimental results are listed in table 1. The polymerization temperature was 140° C., unless otherwise stated. The amount of polymer formed, expressed in grams per mmol of Ti per 10 minutes, is stated under the heading 'yield'. In all experiments the aluminum and titanium compounds were used in amounts of 2.0 and 0.1 mmol per liter, respectively. The magnesium compound was used in an amount set forth under the heading "Mg conc.", in mmol per liter. DEAC refers to $AlEt_2Cl$; SEAC refers to $AlEt_{1\frac{1}{2}}Cl_{1\frac{1}{2}}$, and TBT refers to tetrabutyltitanate.

TABLE 1

| | Catalyst components mmoles/l of pentamethylheptane | | | | | | |
|---|---|---|---|---|---|---|---|
| No. | Al comp. | Mg comp. | Mg conc. | Ti comp. | Decanol | Yield | Intrinsic viscosity |
| 1[4] | DEAC | — | | $TiCl_4$ | — | 39 | 5.3 |
| 2[1] | DEAC | $Mg(O_iC_3H_7)(OC_{10}H_{21})$ | 0.4 | $TiCl_4$ | — | 160 | 3.8 |
| 3[1] | DEAC | $Mg(O_iC_3H_7)(OC_{10}H_{21})$ | 0.4 | $TiCl_4$ | 0.4 | 181 | 3.9 |
| 4[1] | DEAC | $Mg(O_iC_3H_7)(OC_{10}H_{21})$ | 0.4 | $TiCl_4$ | 0.8 | 207 | 4.2 |
| 5[1] | DEAC | $Mg(O_iC_3H_7)(OC_{10}H_{21})$ | 0.4 | $TiCl_3$ | 1.0 | 195 | 4.5 |
| 6[4] | SEAC | — | | TBT | — | 7 | 2.6 |
| 7 | SEAC | $Mg(O_iC_3H_7)(OC_{10}H_{21})$ | 0.2 | TBT | — | 36 | 4.0 |
| 8 | SEAC | $Mg(O_iC_3H_7)(OC_{10}H_{21})$ | 0.4 | TBT | — | 122 | 4.1 |
| 9 | SEAC | $Mg(O_iC_3H_7)(OC_{10}H_{21})$ | 0.6 | TBT | — | 210 | 3.6 |
| 10 | SEAC | $Mg(O_iC_3H_7)(OC_{10}H_{21})$ | 0.7 | TBT | — | 210 | 3.1 |
| 11[2] | DEAC | 0.4 mmole of mixture | | $TiCl_4$ | — | 132 | 4.1 |
| 12[2] | DEAC | of | | $TiCl_4$ | 0.8 | 133 | 4.3 |
| 13[2] | DEAC | $Mg(O_iC_3H_7)_2 +$ | | $TiCl_4$ | 1.0 | 122 | 5.0 |
| 14[2] | DEAC | $Mg(OC_{10}H_{21})_2$ | | $TiCl_4$ | 1.2 | 117 | 5.4 |
| 15[3][4] | DEAC | | (0.4) | $TiCl_4$ | — | 30 | 5.7 |
| 16[3][4] | DEAC | $Mg(OC_{10}H_{21})_2$ | (0.8) | $TiCl_4$ | — | 21 | 5.4 |
| 17[3] | DEAC | | 0.4 | $TiCl_4$ | — | 245 | 3.2 |
| 18 | DEAC | $Mg(stearate)_2$ | 0.2 | $TiCl_4$ | — | 80 | 4.1 |
| 19 | DEAC | $Mg(stearate)_2$ | 0.4 | $TiCl_4$ | — | 97 | 4.1 |
| 20 | DEAC | $Mg(stearate)_2$ | 0.45 | $TiCl_4$ | — | 122 | 4.2 |
| 21 | DEAC | $Mg(stearate)_2$ | 0.55 | $TiCl_4$ | — | 84 | 3.9 |
| 22 | SEAC | $Mg(stearate)_2$ | 0.4 | $TiCl_4$ | — | 47 | 1.8 |
| 23 | SEAC | $Mg(stearate)_2$ | 0.6 | $TiCl_4$ | — | 83 | 2.0 |
| 24[4] | SEAC | — | | $TiCl_4$ | — | 5 | 1.7 |
| 25 | DEAC | $Mg[Al(OC_2H_5)_4]_2$ | 0.1 | $TiCl_4$ | — | 104 | — |

TABLE 1-continued

| No. | Al comp. | Mg comp. | Mg conc. | Ti comp. | Decanol | Yield | Intrinsic viscosity |
|---|---|---|---|---|---|---|---|
| 26 | DEAC | Mg[Al(OC$_2$H$_5$)$_4$]$_2$ | 0.2 | TiCl$_4$ | — | 187 | — |

Notes to Table 1

[1] Magnesium diisopropylate is at most only very slightly soluble in pentamethylheptane. Even upon heating the 140° C. and the addition of aluminum compounds, it remains a suspension. By adding an equimolar amount of decanol to the suspension, and heating to 140° C., the suspension of magnesium diisopropylate is converted to a clear solution of magnesium isopropylate-decanolate, which produces good yield of polymer (Example 2). The polymer yield is further increased by the addition of greater amounts of decanol (Examples 3 and 4) but the polymer yield finally decreases upon even greater amounts of decanol (Example 5), being added.

[2] A suspension of magnesium diisopropylate and magnesium didecanolate in pentamethylheptane becomes a highly viscous, somewhat turbid solution upon heating at 150° C. with stirring, with good polymer yields (Examples 11–14).

[3] A suspension of magnesium decanolate in pentamethylheptane becomes a clear, highly viscous solution upon heating at 140° C. with stirring. After a short while, however, coagulation occurs, and the magnesium decanolate is completely precipitated from the solution, with the clear supernatant liquid no longer containing magnesium. Polymer yields are low when using this magnesium component (Example 15 and 16). Upon addition of 10 mole percent of aluminum triisobutyl, based on the amount of magnesium compound, the precipitate goes into solution, allowing the production of high polymer yields (Example 17).

[4] Example not according to the present invention.

EXAMPLES 27–30

10 mmole of anhydrous magnesium chloride and 10 mmol of aluminum ethyl sesquichloride were added to 100 ml of pentamethylheptane, and the resulting mixture was heated under nitrogen for 1 hour at 140° C. and thereafter was cooled to room temperature and stores over night. The magnesium content of the clear supernatant layer was approximately 14% of the total amount of the magnesium. 10 ml of this clear supernatant layer, plus, in some instances, 0.8 mmole of decanol and 0.05 mmol of titanium tetrachloride, were fed to a 1 liter glass reactor containing 500 ml of pentamethylheptane at a temperature of 140° C. and atmospheric pressure. At the same time that the catalyst components were introduced in the reactor, dry ethylene was also introduced with stirring. After 10 minutes, either 0.5 or 1.0 mmol of triethyl aluminum was added, and thereafter the polymerization was continued for another 10 minutes. The catalyst concentrations in each of Examples 27–30, as well as the yield of polymer produced, and the intrinsic viscosity of such polymer, are reported in Table 2 below, wherein Examples 27 and 29 contain no dissolved magnesium compound and are therefore outside of the scope of the present invention.

TABLE 2

| example no. | AlEt$_{1.5}$Cl$_{1.5}$ | Decanol | dissolved magnesium compound | TiCl$_4$ | Al(Et)$_3$ | yield g of polymer per mmole Ti after 20 min. | intrinsic viscosity |
|---|---|---|---|---|---|---|---|
| 27 | 2.0 | — | — | 0.1 | 1 | 56 | 5.7 |
| 28 | 2.0 | — | 0.28 | 0.1 | 1 | 165 | 3.35 |
| 29 | 2.0 | 1.6 | — | 0.1 | 2 | 120 | 4.74 |
| 30 | 2.0 | 1.6 | 0.28 | 0.1 | 2 | 272 | 2.01 |

EXAMPLES 31–32

Propylene was polymerized for 1 hour at 130° C. in the way described in the examples 1–26.

| No. | DEAC | Mg(O$_i$C$_3$H$_7$)(OC$_{10}$H$_{21}$) | TiCl$_3$ | Yield | intrinsic viscosity |
|---|---|---|---|---|---|
| 31 | 4 | — | 4 | 2.1 | 0.7 |
| 32 | 4 | 2 | 4 | 9.7 | 1.1 |

Under the heading 'yield' the numbers of grams of polypropylene is given per mmole of Ti per hour.

EXAMPLES 33–61

For comparison, a number of tests were conducted in the way described in the examples 1–26, applying metalalkoxy compounds other than the magnesium compounds according to the invention.

| No. | DEAC | Me(OR)$_n$ | Concentration | TiCl$_4$ | Decanol | yield |
|---|---|---|---|---|---|---|
| 33 | 2 | — | — | 0.1 | — | 24 |
| 34 | 2 | — | — | 0.1 | 0.8 | 24 |
| 35 | 2 | — | — | 0.1 | 1.6 | 12 |
| 36 | 2 | Zn(OC$_{10}$H$_{21}$)$_2$ | 0.1 | 0.1 | — | 20 |
| 37 | 2 | " | 0.2 | 0.1 | — | 11 |
| 38 | 2 | " | 0.4 | 0.1 | — | 12 |
| 39 | 2 | " | 0.6 | 0.1 | — | 4 |
| 40 | 2 | " | 0.4 | 0.1 | 0.2 | 6 |
| 41 | 2 | " | 0.4 | 0.1 | 0.4 | 9 |
| 42 | 2 | " | 0.4 | 0.1 | 0.6 | 8 |
| 43 | 2 | " | 0.4 | 0.1 | 1.0 | 4 |
| 44 | 2 | " | 0.4 | 0.1 | 1.2 | 2 |
| 45 | 2 | Li(OC$_{10}$H$_{21}$) | 0.1 | 0.1 | — | 4 |
| 46 | 2 | " | 0.2 | 0.1 | — | 4 |
| 47 | 2 | " | 0.1 | 0.1 | 0.4 | 8 |
| 48 | 2 | " | 0.1 | 0.1 | 0.6 | 3 |
| 49 | 2 | " | 0.1 | 0.1 | 1.0 | 1.2 |
| 50 | 2 | Na(OC$_{10}$H$_{21}$) | 0.2 | 0.1 | 0.1 | 19 |
| 51 | 2 | " | 1.6 | 0.1 | 0.4 | 17 |
| 52 | 2 | Ca(Oφ)$_2$ | 0.1 | 0.1 | — | 44 |
| 53 | 2 | " | 0.7 | 0.1 | — | 54 |

-continued

| | catalyst components in mmoles per liter of pentamethylheptane | | | | |
|---|---|---|---|---|---|
| No. | DEAC | Me(OR)$_n$ | Concentration | TiCl$_4$ | Decanol | yield |
| 54 | 2 | Al(O$_i$C$_3$H$_7$)$_3$ | 0.1 | 0.1 | — | 40 |
| 55 | 2 | " | 0.2 | 0.1 | — | 64 |
| 56 | 2 | " | 0.4 | 0.1 | — | 84 |
| 57 | 2 | " | 0.6 | 0.1 | — | 76 |
| 58 | 2 | LiAl(OC$_{10}$H$_{21}$)$_4$ | 0.1 | 0.1 | — | 12 |
| 59 | 2 | " | 0.2 | 0.1 | — | 7.6 |
| 60 | 2 | " | 0.4 | 0.1 | — | 9.8 |
| 61 | 2 | " | 0.6 | 0.1 | — | 16 |

The yield is expressed in grams of polymer per mmole of titanium per 10 minutes.

What is claimed is:

1. In a process for the solution polymerization of ethylene or mixtures of ethylene with at most 20 mole percent of at least one other olefinic monomer in an inert liquid organic solvent at temperatures above 110° C., said polymerization being in the presence of a catalyst obtained by mixing a transition metal compound with a reducing organo-metal compound, the improvement comprising conducting said polymerization in the presence of a catalyst dissolved in said inert liquid organic solvent and consisting essentially of the product obtained by mixing,
   (a) at least one tetravalent titanium compound, said compound being a halide, an alkoxide, or mixture thereof;
   (c) MgCl$_2$ which is rendered soluble in said inert liquid solvent by admixture with aluminum alkyl sesquichloride, monoalkyl aluminum chloride, or trialkyl aluminum,
   (c) an organo-aluminum halide of the general formula AlR$_{3-z}$X$_z$, wherein R is selected from the group consisting of alkyl, alkenyl, cycloalkyl, alkaryl, aryl, and aralkyl of up to 30 carbon atoms, X is halogen, and Z is a number at least equal to 1 but less than 3, wherein the molar ratio between said MgCl$_2$, and said organo-aluminum halide (c) is between 0.01 and 1.5, the ratio between said organo-aluminum halide (c) and said titanium compound is between 8 and 2000, and the concentration of said titanium compounds in the said organic solvent during said polymerization is between 0.0005 and 0.2 mmole per liter.

2. In a process for the solution polymerization of ethylene or mixtures of ethylene with at most 20 mole percent of at least one other olefinic monomer in an inert liquid organic solvent at temperatures above 110° C., said polymerization being in the presence of a catalyst obtained by mixing a transition metal compound with a reducing organo-metal compound, the improvement comprising conducting said polymerization in the presence of a catalyst, dissolved in said inert liquid organic solvent and consisting essentially of the product obtained by mixing,
   (a) at least one tetravalent titanium compound, said compound being a halide, an alkoxide, or mixture thereof;
   (b) at least one magnesium complex of at least one magnesium compound and one aluminum compound of the formula Mg[Al(OR')$_4$]$_2$ or Mg$_3$[Al(OR')$_6$]$_2$, wherein R' is an alkyl group of 1 to 30 carbon atoms, and mixtures thereof, and
   (c) an organo-aluminum halide of the general formula AlR$_{3-z}$X$_z$, wherein R is selected from the group consisting of alkyl, alkenyl, cycloalkyl, alkaryl, aryl, and aralkyl of up to 30 carbon atoms, X is halogen, and z is a number at least equal to 1 but less than 3, wherein the molar ratio between said magnesium complex and said organo-aluminum halide (c) is between 0.01, and 1.5, the ratio between said organo-aluminum halide (c) and said titanium compound is between 8 and 2000, and the concentration of said titanium compounds in the said organic solvent during said polymerization is between 0.0005 and 0.2 mmole per liter.

3. The process of claim 2, wherein said complex is Mg[Al(OC$_2$H$_5$)$_4$]$_2$.

4. In a process for the solution polymerization of ethylene or mixtures of ethylene with at most 20 mole percent of at least one other olefinic monomer in an inert liquid organic solvent at temperatures above 110° C., said polymerization being in the presence of a catalyst obtained by mixing a transition metal compound with a reducing organo-metal compound, the improvement comprising conducting said polymerization in the presence of a catalyst dissolved in said inert liquid organic solvent and consisting essentially of the product obtained by mixing,
   (a) at least one tetravalent titanium compound, said compound being a halide, an alkoxide, or mixture thereof;
   (b) magnesium decanolate which is rendered soluble in said inert liquid organic solvent by being admixed with an aluminum compound which is trialkyl aluminum or trialkoxy aluminum;
   (c) an organo-aluminum halide of the general formula AlR$_{3-z}$X$_z$, wherein R is selected from the group consisting of alkyl, alkenyl, cycloalkyl, alkaryl, aryl, and aralkyl of up to 30 carbon atoms, X is halogen, and z is a number at least equal to 1 but less than 3, wherein the molar ratio between said magnesium decanolate and said organo-aluminum halide (c) is between 0.01 and 1.5, the ratio between said organo-aluminum halide (c) and said titanium compound is between 8 and 2000, and the concentration of said titanium compounds in the said organic solvent during said polymerization is between 0.0005 and 0.2 mmole per liter.

5. In a process for the solution polymerization of ethylene or mixtures of ethylene with at most 20 mole percent of at least one other olefinic monomer in an inert liquid organic solvent at temperatures above 110° C., said polymerization being in the presence of a catalyst obtained by mixing a transition metal compound with a reducing organo-metal compound, the improvement comprising conducting said polymerization in the presence of a catalyst dissolved in said inert liquid organic solvent and consisting essentially of the product obtained by mixing,
   (a) at least one tetravalent titanium compound, said compound being a halide, an alkoxide, or mixture thereof;
   (b) MgCl$_2$ which is solubilized in said inert liquid solvent by admixture with aluminum ethyl sesquichloride, monobutyl aluminum chloride, or triethyl aluminum, and
   (c) an organo-aluminum halide of the general formula AlR$_{3-z}$X$_z$, wherein R is selected from the group consisting of alkyl, alkenyl, cycloalkyl, alkaryl, aryl, and aralkyl of up to 30 carbon atoms, X is halogen, and z is a number at least equal to 1 but less than 3, wherein the molar ratio between said MgCl$_2$ and said organo-aluminum halide (c) is between 0.01 and 1.5, the ratio between said organo-aluminum halide (c) and said titanium compound is between 8 and 2000, and the concentration of said titanium compounds in the said organic solvent during said polymerization is between 0.0005 and 0.2 mmole per liter.

6. In a process for the solution polymerization of ethylene or mixtures of ethylene with at most 20 mole percent of at least one other olefinic monomer in an inert liquid organic solvent at temperatures above 110° C., said polymerization being in the presence of a catalyst obtained by mixing a transition metal compound with a reducing organo-metal compound, the improvement comprising conducting said polymerization in the presence of a catalyst dissolved in said inert liquid organic solvent and consisting essentially of the product obtained by mixing, (a) at least one tetravalent titanium compound, said compound being a halide, an alkoxide, or mixture thereof;
(b) magnesium isopropylate, which is solubilized in said inert liquid organic solvent by admixture with decanol and with subsequent heating to temperature of about 140° C.,
(c) an organo-aluminum halide of the general formula AlR$_{3-z}$X$_z$, wherein R is selected from the group consisting of alkyl, alkenyl, cycloalkyl, alkaryl, aryl, and aralkyl of up to 30 carbon atoms, X is halogen, and z is a number at least equal to 1 but less than 3, wherein the molar ratio between said magnesium isopropylate and said organo-aluminum halide is between 0.01 and 1.5, the ratio between said organo-aluminum halide (c) and said titanium compound is between 8 and 2000, and the concentration of said titanium compounds in the said organic solvent during said polymerization is between 0.0005 and 0.2 mmole per liter.

* * * * *